United States Patent [19]

Nishizawa et al.

[11] Patent Number: 5,801,109
[45] Date of Patent: Sep. 1, 1998

[54] ALKALI-FREE GLASS AND FLAT PANEL DISPLAY

[75] Inventors: Manabu Nishizawa; Yasumasa Nakao, both of Yokohama, Japan

[73] Assignee: Asahi Glass Company Ltd., Tokyo, Japan

[21] Appl. No.: 669,797

[22] Filed: Jun. 27, 1996

Related U.S. Application Data

[63] Continuation of Ser. No. 563,824, Nov. 28, 1995, abandoned.

[30] Foreign Application Priority Data

Nov. 30, 1994 [JP] Japan .................................. 6-296522
Oct. 20, 1995 [JP] Japan .................................. 7-273234

[51] Int. Cl.⁶ .......................... C03C 3/091; C03C 3/085
[52] U.S. Cl. .............................. 501/66; 501/69; 501/70
[58] Field of Search .................................. 501/66, 69, 70

[56] References Cited

U.S. PATENT DOCUMENTS

| | | | |
|---|---|---|---|
| 4,824,808 | 4/1989 | Dumbaugh, Jr. ......................... | 501/66 |
| 4,994,415 | 2/1991 | Imai et al. .............................. | 501/66 |
| 5,244,847 | 9/1993 | Kushitani et al. ....................... | 501/66 |
| 5,348,916 | 9/1994 | Kushitani et al. ....................... | 501/66 |
| 5,374,595 | 12/1994 | Dumbaugh, Jr. et al. ................. | 501/66 |
| 5,387,560 | 2/1995 | Ponthieu et al. ........................ | 501/66 |
| 5,459,109 | 10/1995 | Lapp ..................................... | 501/69 |
| 5,489,558 | 2/1996 | Moffatt et al. .......................... | 501/66 |
| 5,506,180 | 4/1996 | Ponthieu ................................ | 501/66 |
| 5,508,237 | 4/1996 | Moffatt et al. .......................... | 501/69 |

*Primary Examiner*—Karl Group
*Attorney, Agent, or Firm*—Oblon, Spivak, McClelland, Maier & Neustadt, P.C.

[57] ABSTRACT

An alkali-free glass consisting essentially of from 60 to 73 mol % of $SiO_2$, from 5 to 16 mol % of $Al_2O_3$, from 5 to 12 mol % of $B_2O_3$, from 0 to 6 mol % of MgO, from 0 to 9 mol % of CaO, from 1 to 9 mol % of SrO, from 0 to less than 1 mol % of BaO, and from 7 to 18 mol % of MgO+CaO+SrO+BaO and having a strain point of at least 640° C.

12 Claims, No Drawings

1

ALKALI-FREE GLASS AND FLAT PANEL DISPLAY

This is a continuation of application Ser. No. 08/563,824 filed on Nov. 28, 1995, now abandoned.

BACKGROUND OF THE INVENTION

1. Field of the Invention

The present invention relates to alkali-free glasses which are suitable as substrate glasses for various displays or photomasks and which are essentially free from alkali metal oxides and can be formed by float process, and flat panel displays employing them.

2. Discussion of Background

Heretofore, the following properties have been required for substrate glasses for various displays, particularly for the one intended to form a thin film of a metal or oxide on its surface.

(1) They are essentially free from alkali metal oxides. If an alkali metal oxide is contained, the alkali metal ion tends to diffuse in the thin film, whereby the film properties will deteriorate.

(2) They have high strain points, so that when they are exposed to a high temperature during the process for forming a thin film, deformation of the glass and shrinkage due to stabilization of the glass structure are suppressed to the minimum levels.

(3) They have adequate chemical durability against various reagents to be used for forming semiconductors. Particularly, they have durability against hydrofluoric acid used for etching $SiO_x$ or $SiN_x$ or against a buffered hydrofluoric acid (BHF) containing ammonium fluoride and hydrofluoric acid as the main components.

(4) They have no internal or surface defects (such as bubbles, striae, inclusions, pits or scratch marks).

At present, Corning code 7059 glass is widely employed as a substrate glass for various displays or photomasks. However, this glass has the following deficiencies for displays.

(1) The strain point is as low as 593° C., and preliminary heat treatment to reduce the shrinkage of glass has to be carried out prior to a process for preparing the displays.

(2) The amount of elution into hydrochloric acid used for etching a metal electrode or a transparent conductive film (such as ITO) is substantial, and the eluted substance tends to recrystallize during the process for preparing displays, whereby it becomes difficult to prepare the displays.

In addition to the above requirements, the following two points have been additionally required along with the trend for large sized displays in recent years.

(1) The above-mentioned code 7059 glass has a density of 2.76 g/cc, and a glass having a smaller density is required to meet a requirement for light weight.

(2) The above code 7059 glass has a coefficient of thermal expansion of $46 \times 10^{-7}$/° C., and a glass having a smaller coefficient of thermal expansion is required to increase the rate of temperature increase for the preparation of displays and thus to increase the throughput.

With respect to $B_2O_3$, U.S. Pat. No. 4,824,808 discloses a glass product containing from 20 to 23 cation % of $B_2O_3$, but the amount of $B_2O_3$ is so large that the strain point is not sufficiently high. Japanese Unexamined Patent Publication No. 281041/1986 discloses a product containing from 0.1 to 4 wt % of $B_2O_3$. Japanese Unexamined Patent Publication No. 175242/1992 discloses a product containing from 0.1 to 5 mol % of $B_2O_3$, and U.S. Pat. No. 5,244,847 discloses a product containing from 0 to 3 wt % of $B_2O_3$. However, in each of them, the amount of $B_2O_3$ is so small that the durability against BHF is not sufficient.

With respect to BaO, U.S. Pat. No. 5,348,916 discloses a glass product containing from 10 to 20 wt % of BaO, U.S. Pat. No. 4,994,415 discloses a product containing from 10 to 22 wt % of BaO, and Japanese Unexamined Patent Publication No. 169953/1984 discloses a product containing from 15 to 40 wt % of BaO. However, in each of them, BaO is so large that the coefficient of thermal expansion is large, and the density is high.

With respect to MgO, Japanese Unexamined Patent Publication No. 132536/1986 discloses a glass product containing from 6.5 to 12 wt % of MgO, U.S. Pat. No. 4,501,819 discloses a product containing from 5 to 15 wt % of MgO, Japanese Unexamined Patent Publication No. 71540/1985 discloses a product containing from 5 to 17 wt % of MgO, and Japanese Unexamined Patent Publication No. 42246/1985 discloses a product containing from 10 to 25 mol % of MgO. However, such glass containing a large amount of MgO tends to undergo phase separation.

With respect to CaO, Japanese Unexamined Patent Publication No. 176332/1988 discloses a glass product containing from 11 to 25 wt % of CaO, U.S. Pat. No. 3,207,315 discloses a product containing from 7 to 20 mol % of CaO, Japanese Unexamined Patent Publication No. 133334/1990 discloses a product containing from 8 to 15 wt % of CaO, Japanese Unexamined Patent Publication No. 174336/1991 discloses a product containing from 7 to 12 wt % of CaO, Japanese Unexamined Patent Publication No. 40739/1994 discloses a product containing from 10 to 12 wt % of CaO, and U.S. Pat. No. 5,387,560 discloses a product containing at least 18 cation % of CaO. However, if CaO is contained in a large amount, the coefficient of thermal expansion tends to be too large.

With respect to $Al_2O_3$, Japanese Unexamined Patent Publication No. 236631/1986 discloses a glass product containing from 22.5 to 35 wt % of $Al_2O_3$, but the amount of $Al_2O_3$ is so large that elution to a chemical reagent such as hydrochloric acid is substantial.

With respect to $P_2O_5$, Japanese Unexamined Patent Publications No. 261232/1986 and No. 11543/1988 disclose those containing $P_2O_5$. However, they are not desirable, since they tend to deteriorate the semiconductor properties of thin films.

Further, glass having a strain point of at least 640° C. and a relatively small coefficient of thermal expansion is disclosed in Japanese Unexamined Patent Publication No. 160030/1992 or U.S. Pat. No. 5,374,595. However, such glass contains a substantial amount of BaO as an essential element, whereby it is difficult to satisfy the requirements for low density and small thermal expansion coefficient simultaneously. Accordingly, it does not fully satisfy the demand of the age for large sized panels.

SUMMARY OF THE INVENTION

It is an object of the present invention to solve the above drawbacks and to provide alkali-free glasses which have strain points of at least 640° C. and small coefficients of thermal expansion and are free from forming of turbidity by BHF and which are excellent in the durability against reagents such as hydrochloric acid, are easy to melt and shape and can be formed by float process.

The present invention provides an alkali-free glass consisting essentially of from 60 to 73 , preferably 72 mol % of $SiO_2$, from 5, preferably 9 to 16 mol % of $Al_2O_3$, from 5 to 12 mol % of $B_2O_3$, from 0 to 6 mol % of MgO, from 0 to 9 mol % of CaO, from 1 to 9 mol % of SrO, from 0 to less than 1 mol % of BaO, and from 7 to 18 mol % of MgO+CaO+SrO+BaO and having strain point of at least 640° C.

DETAILED DESCRIPTION OF THE PREFERRED EMBODIMENTS

The alkali-free glasses of the present invention are essentially free from alkali metal oxides (such as $Na_2O$ or $K_2O$). Specifically, the total amount of alkali metal oxides is preferably not higher than 0.5 wt %, more preferably not higher than 0.2 wt %.

Now, the reasons for defining the compositional ranges of the respective components as mentioned above, will be described.

If the content of $SiO_2$ is less than 60 mol %, it tends to be difficult to increase the strain point sufficiently, and the chemical durability tends to deteriorate and the coefficient of thermal expansion tends to increase. If it exceeds 73 mol %, the melting property tends to be poor, and the liquidus temperature tends to increase. Preferably, $SiO_2$ is from 66 to 70 mol %.

$Al_2O_3$ suppresses phase separation of glass, reduces the coefficient of thermal expansion and increases the strain point. If its content is less than 5 mol %, no adequate effects can be obtained, and if it exceeds 16 mol %, the melting property of glass tends to be poor. Preferably, $Al_2O_3$ is from 9 to 14 mol %.

$B_2O_3$ serves to prevent formation of turbidity by BHF and is effective to lower the coefficient of thermal expansion and the density without increasing the viscosity at a high temperature. If its content is less than 5 mol %, the BHF property tends to deteriorate, and if it exceeds 12 mol %, the acid resistance tends to deteriorate, and the strain point tends to be low. Preferably, $B_2O_3$ is from 6 to 9.5 mol %.

MgO is not essential but may be contained, as it lowers the coefficient of thermal expansion without lowering the strain point, among alkaline earth metal oxides. If its content exceeds 6 mol %, turbidity by BHF or phase separation of glass tends to occur. Preferably, MgO is from 1 to 5 mol %.

CaO is not essential, but by its incorporation, it is possible to improve the melting property of glass. On the other hand, if it exceeds 9 mol %, coefficient of thermal expansion tends to be large, and the liquidus temperature tends to be high. Preferably, CaO is from 1 to 6 mol %.

SrO is contained at least 1 mol %, since it serves to suppress phase separation of glass and is a relatively useful component against turbidity by BHF. If the content exceeds 9 mol %, the coefficient of thermal expansion tends to increase. Preferably, SrO is from 2 to 8 mol %.

BaO is a component which is effective for suppressing phase separation of glass, for improving the melting property and for suppressing the liquidus temperature. However, if its content is 1 mol % or more, the density tends to be high, and the coefficient of thermal expansion tends to increase. With a view to reducing the density and the coefficient of thermal expansion, its content is preferably not higher than 0.5 mol %, more preferably, it is not substantially contained except for the amount contained as an impurity.

If the total amount of MgO+CaO+SrO+BaO is less than 7 mol %, the melting tends to be difficult. If the total amount exceeds 15 mol %, the density tends to be high. Preferably, the total amount is from 9 to 16 mol %.

In recent years, TFT of polycrystalline silicon (poly-Si) has been proposed and employed against TFT of amorphous silicon (a-Si) which has already been commercialized and used for liquid crystal display devices. TFT of poly-Si has merits such that (1) since the mobility of transistor can be increased, the control time per pixel can be shortened, whereby high precision of LCD can be accomplished, (2) it becomes possible to mount driving ICs along the periphery of the picture surface. On the other hand, however, intensive heat treatment (such as at a temperature of from 500° to 600° C. for few hours) is required in the process for its preparation. At such a high temperature, impurities in glass tend to diffuse into TFT to increase leak current, deteriorate TFT characteristics and make it difficult to prepare high precision TFT. The most problematic among such impurities is phosphorus. Therefore, in the present invention, P is preferably controlled to be at most 20 atomic (cation) ppm, since it tends to bring about a drawback that phosphorus diffuses into TFT by the heat treatment to increase leak current and deteriorate the TFT characteristics.

In the glass of the present invention, in addition to the above components, ZnO, $SO_3$, F and Cl may be incorporated in a total amount of at most 5 mol %, in order to improve the melting property, the clarity and the forming property of the glass.

Further, if PbO, $As_2O_3$ or $Sb_2O_3$ is contained, a number of steps will be required for treatment of glass cullet. Therefore, it is preferred that no such a component is incorporated except for an amount unavoidably included as an impurity.

Thus, a glass composition according to a preferred embodiment of the present invention consists essentially of from 66 to 70 mol % of $SiO_2$, from 9 to 14 mol % of $Al_2O_3$, from 6 to 9.5 mol % of $B_2O_3$, from 1 to 5 mol % of MgO, from 1 to 6 mol % of CaO, from 2 to 8 mol % of SrO, and from 9 to 16 mol % of MgO+CaO+SrO and essentially free from BaO.

The glass of the present invention has a strain point of at least 640° C. The strain point is preferably at least 650° C. The coefficient of thermal expansion is preferably less than $40 \times 10^{-7}/°$ C., more preferably from 28 to $40 \times 10^{-7}/°$ C. The density is preferably less than 2.60 g/cc, more preferably less than 2.55 g/cc, most preferably less than 2.50 g/cc.

The glass of the present invention can be prepared, for example, by the following method. Namely, raw materials of the respective components which are commonly used, are blended to obtain a desired composition, which is continuously introduced into a melting furnace, and melted at a temperature of from 1600° to 1650° C. This molten glass is formed into a sheet having a predetermined thickness by float process, and the sheet is annealed and then cut. A glass sheet thus obtained may be used as one of the pair of substrates constituting a cell for flat panel displays.

EXAMPLES 1 to 32

Raw materials for the respective components were mixed to have the desired composition and melted at a temperature of from 1600° to 1650° C. by means of a platinum crucible. During the melting, a platinum stirrer was used for stirring to homogenize the glass. Then, the molten glass was cast and formed into a sheet, followed by annealing.

In Tables 1 to 4, the glass compositions thus obtained as well as the coefficients of thermal expansion, high temperature viscosities, liquidus temperatures, strain points, densities, acid resistance and BHF resistance, are shown. Examples 1 to 25 and 28 to 31 are Examples of the present invention, and Examples 26, 27 and 32 are Comparative Examples. In Examples 28 to 32, the content of phosphorus (atomic (cation) ppm) and the leak current representing the TFT characteristics are also given. The coefficient of thermal expansion is represented by a unit of $10^{-7}/°$ C. The high temperature viscosity is represented by a temperature (unit: ° C.) at which the viscosity became $10^2$ or $10^4$ poise. The liquidus temperature and the strain point are represented by a unit of ° C., and the density is represented by a unit of g/cc. The strain point was measured in accordance with JIS R3103.

The acid resistance is represented by the weight loss per unit area (unit: mg/cm$^2$) after immersion for 20 hours in 0.1N HCl at 90° C. The acid resistance is preferably not more than 0.3 mg/cm$^2$, more preferably not more than 0.2 mg/cm$^2$.

The BHF resistance is represented by the weight loss per unit area (unit: mg/cm$^2$) after immersion in a NH$_4$F/HF mixed solution (a solution having a 40 wt % NH$_4$F aqueous solution and 50 wt % of HF aqueous solution mixed in a volume ratio of 9:1) at 25° C. for 20 minutes. The BHF resistance is preferably not more than 0.7 mg/cm$^2$, more preferably not more than 0.6 mg/cm$^2$.

With respect to the leak current, poly-Si TFT with an electrode length of 10 μm was formed on a glass substrate, and the leak current (unit: pA) was measured at a gate voltage of −5V, a source voltage of 0V and a drain voltage of +10V. The leak current is preferably not more than about 50 pA.

Glasses of Examples 1 to 25 and 28 to 31 show a low coefficient of thermal expansion of from $30×10^{-7}$ to $40×10^{-7}/°$ C. and a high strain point of at least 640° C. and thus adequately durable against heat treatment at a high temperature. Their densities are less than 2.60 g/cc and far less than 2.76 g/cc of Corning code 7059 glass. Also with respect to the chemical characteristics, turbidity scarcely forms by BHF, and they are excellent also in the acid resistance. The temperature corresponding to $10^2$ poise which is an index of meltability, is relatively low, thus indicating that the melting is easy, and the relation between the liquidus temperature and the temperature corresponding to $10^4$ poise which is an index for the forming property, is excellent, thus indicating no possibility of a trouble such as devitrification during the forming.

On the other hand, in Examples 26 and 27 wherein the compositions are outside the scope of the present invention, the coefficients of thermal expansion are large, and the densities are relatively large. In Examples 32, the content of phosphorus is large, whereby the leak current is substantial.

TABLE 1

| | Example No. | | | | | | | | |
|---|---|---|---|---|---|---|---|---|---|
| | 1 | 2 | 3 | 4 | 5 | 6 | 7 | 8 | 9 |
| SiO$_2$ mol % | 65.0 | 68.0 | 69.0 | 67.0 | 66.0 | 68.0 | 69.0 | 67.0 | 66.0 |
| Al$_2$O$_3$ | 12.0 | 11.0 | 11.0 | 13.0 | 10.0 | 11.0 | 11.0 | 12.0 | 14.0 |
| B$_2$O$_3$ | 8.0 | 8.0 | 8.0 | 8.0 | 8.0 | 8.0 | 9.0 | 9.0 | 9.0 |
| MgO | 3.0 | 2.0 | 0.0 | 1.0 | 5.0 | 0.0 | 4.0 | 4.0 | 2.0 |
| CaO | 6.0 | 5.5 | 4.0 | 5.5 | 7.0 | 6.0 | 3.5 | 3.5 | 5.0 |
| SrO | 6.0 | 5.5 | 8.0 | 5.5 | 4.0 | 6.2 | 3.5 | 3.7 | 4.0 |
| BaO | 0.0 | 0.0 | 0.0 | 0.0 | 0.0 | 0.8 | 0.0 | 0.8 | 0.0 |
| MgO + Cao + SrO + BaO | 15.0 | 13.0 | 12.0 | 12.0 | 16.0 | 13.0 | 11.0 | 12.0 | 11.0 |
| Coefficient of thermal expansion (×10$^{-7}$/°C.) | 39 | 35 | 37 | 36 | 39 | 39 | 32 | 33 | 33 |
| High temperature viscosity | | | | | | | | | |
| 10$^2$ poise (°C.) | 1630 | 1730 | 1750 | 1730 | 1660 | 1730 | 1750 | 1740 | 1710 |
| 10$^4$ poise (°C.) | 1260 | 1340 | 1350 | 1340 | 1260 | 1340 | 1320 | 1310 | 1320 |
| Liquidus temperature (°C.) | 1240 | 1310 | 1330 | 1310 | 1260 | 1340 | 1300 | 1280 | 1320 |
| Strain point (°C.) | 650 | 660 | 660 | 670 | 640 | 655 | 670 | 670 | 680 |
| Density (g/cc) | 2.56 | 2.48 | 2.49 | 2.48 | 2.50 | 2.53 | 2.40 | 2.46 | 2.44 |
| Acid resistance (mg/cm$^2$) | 0.18 | 0.10 | 0.07 | 0.15 | 0.13 | 0.11 | 0.12 | 0.15 | 0.20 |
| BHF resistance (mg/cm$^2$) | 0.61 | 0.48 | 0.47 | 0.47 | 0.50 | 0.50 | 0.48 | 0.51 | 0.53 |

TABLE 2

| | Example No. | | | | | | | | |
|---|---|---|---|---|---|---|---|---|---|
| | 10 | 11 | 12 | 13 | 14 | 15 | 16 | 17 | 18 |
| SiO$_2$ mol % | 66.0 | 72.0 | 68.0 | 69.0 | 68.0 | 68.0 | 70.0 | 65.0 | 68.0 |
| Al$_2$O$_3$ | 11.0 | 9.0 | 12.0 | 11.0 | 12.0 | 10.0 | 9.0 | 13.0 | 11.0 |
| B$_2$O$_3$ | 9.0 | 11.0 | 10.0 | 7.0 | 7.0 | 7.0 | 7.0 | 7.0 | 6.0 |
| MgO | 1.0 | 0.0 | 0.0 | 4.3 | 2.6 | 2.5 | 2.5 | 3.0 | 3.0 |
| CaO | 7.0 | 4.0 | 5.0 | 4.3 | 5.2 | 7.0 | 4.5 | 5.0 | 6.0 |
| SrO | 6.0 | 4.0 | 5.0 | 4.3 | 5.2 | 5.5 | 7.0 | 7.0 | 6.0 |
| BaO | 0.0 | 0.0 | 0.0 | 0.0 | 0.0 | 0.0 | 0.0 | 0.0 | 0.0 |
| MgO + CaO + SrO + BaO | 14.0 | 8.0 | 10.0 | 13.0 | 13.0 | 15.0 | 14.0 | 15.0 | 15.0 |
| Coefficient of thermal expansion (×10$^{-7}$/°C.) | 39 | 31 | 33 | 33 | 35 | 39 | 38 | 38 | 38 |
| High temperature viscosity | | | | | | | | | |

TABLE 2-continued

| | Example No. | | | | | | | | |
|---|---|---|---|---|---|---|---|---|---|
| | 10 | 11 | 12 | 13 | 14 | 15 | 16 | 17 | 18 |
| $10^2$ poise (°C.) | 1700 | 1810 | 1740 | 1730 | 1710 | 1700 | 1730 | 1640 | 1720 |
| $10^4$ poise (°C.) | 1290 | 1370 | 1340 | 1340 | 1340 | 1320 | 1350 | 1300 | 1310 |
| Liquidus temperature (°C.) | 1250 | 1310 | 1300 | 1340 | 1320 | 1320 | 1350 | 1300 | 1300 |
| Strain point (°C.) | 640 | 640 | 640 | 680 | 680 | 665 | 660 | 660 | 685 |
| Density (g/cc) | 2.52 | 2.38 | 2.44 | 2.46 | 2.48 | 2.52 | 2.51 | 2.55 | 2.53 |
| Acid resistance (mg/cm$^2$) | 0.13 | 0.22 | 0.28 | 0.07 | 0.09 | 0.06 | 0.06 | 0.08 | 0.06 |
| BHF resistance (mg/cm$^2$) | 0.50 | 0.45 | 0.47 | 0.52 | 0.53 | 0.56 | 0.53 | 0.58 | 0.54 |

TABLE 3

| | Example No. | | | | | | | | |
|---|---|---|---|---|---|---|---|---|---|
| | 19 | 20 | 21 | 22 | 23 | 24 | 25 | 26 | 27 |
| SiO$_2$ mol % | 67.0 | 66.0 | 69.0 | 69.0 | 68.0 | 70.0 | 68.0 | 67.0 | 67.0 |
| Al$_2$O$_3$ | 13.0 | 14.0 | 12.0 | 11.0 | 13.0 | 12.0 | 11.0 | 11.0 | 11.0 |
| B$_2$O$_3$ | 6.0 | 6.0 | 5.0 | 8.0 | 7.0 | 9.0 | 6.0 | 8.0 | 8.0 |
| MgO | 2.0 | 2.0 | 2.0 | 2.0 | 4.0 | 1.0 | 2.0 | 2.0 | 2.0 |
| CaO | 6.0 | 8.0 | 6.0 | 4.6 | 4.6 | 3.6 | 5.6 | 5.0 | 5.0 |
| SrO | 6.0 | 4.0 | 6.0 | 5.0 | 3.0 | 4.0 | 7.0 | 2.0 | 4.0 |
| BaO | 0.0 | 0.0 | 0.0 | 0.4 | 0.4 | 0.4 | 0.4 | 5.0 | 3.0 |
| MgO + CaO + SrO + BaO | 14.0 | 14.0 | 14.0 | 12.0 | 12.0 | 9.0 | 15.0 | 14.0 | 14.0 |
| Coefficient of thermal expansion (×10$^{-7}$/°C.) | 37 | 37 | 37 | 35 | 32 | 31 | 39 | 41 | 40 |
| High temperature viscosity | | | | | | | | | |
| $10^2$ poise (°C.) | 1750 | 1750 | 1770 | 1740 | 1720 | 1780 | 1720 | 1690 | 1690 |
| $10^4$ poise (°C.) | 1320 | 1320 | 1340 | 1330 | 1340 | 1350 | 1310 | 1290 | 1290 |
| Liquidus temperature (°C.) | 1300 | 1300 | 1340 | 1300 | 1280 | 1300 | 1300 | 1250 | 1260 |
| Strain point (°C.) | 695 | 700 | 710 | 670 | 685 | 675 | 670 | 670 | 670 |
| Density (g/cc) | 2.52 | 2.50 | 2.52 | 2.47 | 2.45 | 2.41 | 2.56 | 2.60 | 2.57 |
| Acid resistance (mg/cm$^2$) | 0.06 | 0.06 | 0.05 | 0.12 | 0.07 | 0.14 | 0.06 | 0.08 | 0.08 |
| BHF resistance (mg/cm$^2$) | 0.56 | 0.57 | 0.59 | 0.44 | 0.54 | 0.46 | 0.55 | 0.55 | 0.53 |

TABLE 4

| Example No. | 28 | 29 | 30 | 31 | 32 |
|---|---|---|---|---|---|
| SiO$_2$ mol % | 69.0 | 66.0 | 69.0 | 69.0 | 69.0 |
| Al$_2$O$_3$ | 13.0 | 13.0 | 13.0 | 13.0 | 13.0 |
| B$_2$O$_3$ | 7.0 | 7.0 | 7.0 | 7.0 | 7.0 |
| MgO | 2.0 | 2.0 | 2.0 | 2.0 | 0.0 |
| CaO | 0.0 | 2.0 | 4.0 | 6.0 | 11.0 |
| SrO | 9.0 | 7.0 | 5.0 | 3.0 | 0.0 |
| BaO | 0.0 | 0.0 | 0.0 | 0.0 | 0.0 |
| MgO + CaO + SrO + BaO | 11.0 | 11.0 | 11.0 | 11.0 | 11.0 |
| Coefficient of thermal expansion (×10$^{-7}$/°C.) | 34 | 34 | 33 | 32 | 33 |
| High temperature viscosity | | | | | |
| $10^2$ poise (°C.) | 1740 | 1740 | 1740 | 1750 | 1750 |
| $10^4$ poise (°C.) | 1350 | 1350 | 1350 | 1350 | 1350 |
| Liquidus temperature (°C.) | 1300 | 1300 | 1300 | 1300 | 1300 |
| Strain point (°C.) | 690 | 690 | 690 | 690 | 690 |
| Density (g/cc) | 2.49 | 2.47 | 2.45 | 2.42 | 2.40 |
| Acid resistance (mg/cm$^2$) | 0.05 | 0.05 | 0.05 | 0.05 | 0.05 |
| BHF resistance (mg/cm$^2$) | 0.55 | 0.54 | 0.54 | 0.53 | 0.52 |
| Content of phosphorus (atomic ppm) | 0 | 4 | 8 | 12 | 22 |
| Leak current (pA) | 2 | 8 | 15 | 30 | 90 |

The glass of the present invention can be formed by float process, and it is resistant against formation of turbidity by BHF and has excellent acid resistance, high heat resistance and a low coefficient of thermal expansion. Therefore, it is suitable for display substrates or photomasks substrates. Since the density is very low, it is particularly suitable for large size flat panel displays.

What is claimed is:

1. An alkali-free glass consisting essentially of from 60 to 72 mol % of SiO$_2$, from 9 to 14 mol % of Al$_2$O$_3$, from 5 to 12 mol % of B$_2$O$_3$, from 0 to 6 mol % of MgO, from 0 to 6 mol % of CaO, from 1 to 9 mol % of SrO, from 0 to 0.5 mol % of BaO, and from 7 to 18 mol % of MgO+CaO+SrO+BaC and having a strain point of at least 640° C. and formed from a float process.

2. The alkali-free glass according to claim 1, which contains substantially no PbO, As$_2$O$_3$ or Sb$_2$O$_3$.

3. The alkali-free glass according to claim 1, which has a density of less than 2.60 g/cc.

4. The alkali-free glass according to claim 1, which has a coefficient of thermal expansion of less than 40×10$^{-7}$/° C.

5. The alkali-free glass according to claim 1, wherein the content of P$_2$O$_5$ is not more than 20 ppm in mol.

6. The alkali-free glass according to claim 1, which consists essentially of from 66 to 70 mol % of SiO$_2$, from 9 to 14 mol % of Al$_2$O$_3$, from 6 to 9.5 mol % of B$_2$O$_3$, from 1 to 5 mol % of MgO, from 1 to 6 mole of CaO, from 2 to 8 mol % of SrO, and from 9 to 16 mol % of MgO+CaO+SrO and which contains substantially no BaO.

7. The alkali-free glass according to claim 6, which has a strain point of at least 650° C.

8. The alkali-free glass according to claim 6, which has a density of less than 2.55 g/cc.

9. A liquid display panel comprising a pair of substrates constituting a cell, wherein at least one of the substrates is made of an alkali-free glass consisting essentially of from 60 to 72 mol % of $SiO_2$, from 9 to 14 mol % of $Al_2O_3$, from 5 to 12 mol % of $B_2O_3$, from 0 to 6 mol % of MgO, from 0 to 6 mol % of CaO, from 1 to 9 mol % of SrO, from 0 to 0.5 mol % of BaO, and from 7 to 18 mol % of MgO+CaO+SrO+BaO and having a strain point of at least 640° C. and formed from a float process.

10. The liquid display panel according to claim 9, wherein the alkali-free glass consists essentially of from 66 to 70 mol % of $SiO_2$, from 9 to 14 mol % of $Al_2O_3$, from 6 to 9.5 mol % of $B_2O_3$, from 1 to 5 mol % of MgO, from 1 to 6 mol % of CaO, from 2 to 8 mol % of SrO, and from 9 to 16 mol % of MgO+CaO+SrO and which contains substantially no BaO.

11. The alkali-free glass according to claim 1, wherein the temperature at which the viscosity of said alkali-free glass becomes $10^4$ poises is not lower than the liquidus temperature of said alkali-free glass.

12. The alkali-free glass according to claim 6, wherein the temperature at which the viscosity of said alkali-free glass becomes $10^4$ poises is not lower than the liquidus temperature of said alkali-free glass.

* * * * *